United States Patent
Xiao et al.

(10) Patent No.: US 10,887,740 B2
(45) Date of Patent: Jan. 5, 2021

(54) MESSAGE SENDING METHOD AND APPARATUS

(71) Applicant: Huawei Technologies Co., Ltd., Guangdong (CN)

(72) Inventors: Xiao Xiao, Beijing (CN); Yao Hua, Shenzhen (CN); Mingchao Li, Beijing (CN); Guanglin Han, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 69 days.

(21) Appl. No.: 16/118,178

(22) Filed: Aug. 30, 2018

(65) Prior Publication Data
US 2018/0376308 A1   Dec. 27, 2018

Related U.S. Application Data

(63) Continuation of application No. PCT/CN2016/075636, filed on Mar. 4, 2016.

(51) Int. Cl.
*H04W 4/46* (2018.01)
*H04L 29/04* (2006.01)
(Continued)

(52) U.S. Cl.
CPC ........... *H04W 4/46* (2018.02); *H04L 29/04* (2013.01); *H04L 45/22* (2013.01); *H04L 67/12* (2013.01);
(Continued)

(58) Field of Classification Search
CPC ..... H04L 29/04; H04L 41/0803; H04L 45/22; H04L 67/12; H04L 69/14; H04W 24/10;
(Continued)

(56) References Cited

U.S. PATENT DOCUMENTS

2017/0150490 A1\* 5/2017 Chen ................ H04W 48/02
2018/0103490 A1\* 4/2018 Li ..................... H04W 74/085
(Continued)

FOREIGN PATENT DOCUMENTS

| CN | 104836673 A | 8/2015 |
| CN | 105246025 A | 1/2016 |

(Continued)

OTHER PUBLICATIONS

XP051055161 R2-161189 CATT,"Uu/PC5 V2V Link Selection",3GPP TSG RAN WG2 Meeting #93,St. Julian's Malta, Feb. 15-19, 2016,total 4 pages.
(Continued)

*Primary Examiner* — Robert J Lopata
(74) *Attorney, Agent, or Firm* — Womble Bond Dickinson (US) LLP

(57) ABSTRACT

The present disclosure provides a method of sending a vehicle-to-everything (V2X) service message. The method includes: determining, by a terminal device, a communication path for a V2X service, where the communication path is selected from at least two communication paths, the at least two communication paths include a first communication path and a second communication path, the first communication path is a communication path on which communication is performed using a PC5 interface, and the second communication path is a communication path on which communication is performed using a Uu interface; and sending, by the terminal device, a message of the V2X service by using the communication path. In the foregoing solution, the communication path can be selected from the at least two communication paths, to send the message of the V2X service. In this way, a communication path is flexibly selected for a V2X service.

20 Claims, 5 Drawing Sheets

(51) Int. Cl.
  *H04L 12/707* (2013.01)
  *H04L 29/08* (2006.01)
  *H04L 29/06* (2006.01)
  *H04W 4/70* (2018.01)
  *H04W 76/14* (2018.01)
  *H04W 76/27* (2018.01)
  *H04W 40/12* (2009.01)
  *H04W 36/24* (2009.01)
  *H04L 12/24* (2006.01)
  *H04W 24/10* (2009.01)
  *H04W 72/04* (2009.01)

(52) U.S. Cl.
  CPC .............. *H04L 69/14* (2013.01); *H04W 4/70* (2018.02); *H04W 40/12* (2013.01); *H04W 76/14* (2018.02); *H04W 76/27* (2018.02); *H04L 41/0803* (2013.01); *H04W 24/10* (2013.01); *H04W 36/24* (2013.01); *H04W 72/0406* (2013.01)

(58) Field of Classification Search
  CPC ....... H04W 36/24; H04W 40/12; H04W 4/46; H04W 4/70; H04W 72/0406; H04W 76/14; H04W 76/27
  See application file for complete search history.

(56) References Cited

U.S. PATENT DOCUMENTS

| | | | |
|---|---|---|---|
| 2018/0152819 A1* | 5/2018 | Pinheiro | H04W 4/40 |
| 2018/0184270 A1* | 6/2018 | Chun | H04W 92/18 |
| 2018/0206089 A1* | 7/2018 | Cavalcanti | H04W 4/046 |
| 2018/0288588 A1* | 10/2018 | Uchiyama | H04W 4/40 |
| 2018/0317066 A1* | 11/2018 | Xu | H04W 4/06 |
| 2019/0037430 A1* | 1/2019 | Lee | H04W 4/40 |
| 2019/0045405 A1* | 2/2019 | Byun | H04W 36/0066 |
| 2019/0058980 A1* | 2/2019 | Zhang | H04W 28/12 |

FOREIGN PATENT DOCUMENTS

| | | |
|---|---|---|
| CN | 105282257 A | 1/2016 |
| WO | 2015115870 A1 | 8/2015 |

OTHER PUBLICATIONS

XP051064272 R1-160635 LG Electronics,"Discussion on eNB scheduling enhancement for PC5-based V2V resource allocation",3GPP TSG RAN WG1 Meeting #84 Malta, Malta, Feb. 15-19, 2016,total 4 pages.

* cited by examiner

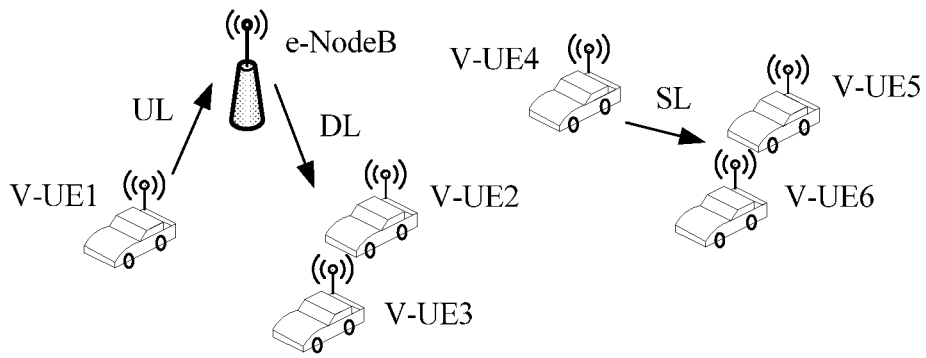

FIG. 1

```
A terminal device determines a communication path for
a V2X service, where the communication path is
selected from at least two communication paths, the at
least two communication paths include a first
communication path and a second communication path,    201
the first communication path is a communication path
on which communication is performed by using a PC5
interface, and the second communication path is a
communication path on which communication is
performed by using a Uu interface
```

```
The terminal device sends a message of the V2X service    202
by using the communication path
```

FIG. 2

MESSAGE SENDING METHOD AND APPARATUS

CROSS-REFERENCE TO RELATED APPLICATIONS

This application is a continuation of International Application No. PCT/CN2016/075636, filed on Mar. 4, 2016, the disclosure of which is incorporated herein by reference in its entirety.

TECHNICAL FIELD

The present disclosure relates to the field of communications systems, and in particular, to a message sending method and an apparatus.

BACKGROUND

Vehicle to vehicle (V2V) communication is a communications technology in which data is transmitted and information is exchanged between vehicles by using a wireless communications technology. As important content of researches about an Intelligent Transportation System (ITS) and the Internet of Vehicles, the V2V communication mainly provides and supports application and service transmission that are related to road transportation safety, and is widely considered as a key technology for enhancing vehicle travel safety and reducing traffic accidents.

A V2V service carried over the V2V communication is implemented by transmitting a V2V message. The V2V message mainly includes some information related to a vehicle travel status, for example, at least one of a speed, a travel direction, a latitude and a longitude, acceleration, whether a vehicle brakes, or whether a lane is changed; and/or includes some information related to a surrounding road environment, for example, at least one of an accident, road construction, and traffic facilities breakdown. Through the V2V communication, a vehicle may exchange a V2V message with another vehicle around, so that a driving system of the vehicle can obtain road condition information in time or receive an information service related to vehicle travel safety in time, assisting a driver of the vehicle or the driving system of the vehicle in predicting a danger and performing a corresponding operation, to avoid an accident as far as possible. The V2V communication is related to key information of vehicle travel safety, and a V2V message needs to be accurately exchanged between vehicles in time. Therefore, the V2V communication has a communication requirement for "high reliability and low latency".

Standardization work of "vehicle-to-everything (V2X) communication based on Long Term Evolution (LTE)" conducted by the 3rd Generation Partnership Project (3GPP) covers vehicle communication scenarios such as V2V, vehicle to infrastructure (V2I), and vehicle-to-pedestrian (V2P). The standardization work aims to provide, based on an LTE communications system, wireless vehicle communication related to road safety. V2V communication based on LTE is an important part of the standardization work, and two communications technologies are provided: device-to-device (D2D) direct communication and LTE eNodeB forwarding communication. The D2D direct communications technology allows direct communication to be performed between user equipment (UE) by using a PC5 interface. Therefore, a transmission latency thereof is relatively low, but V2V message transmission congestion and a data collision are likely to occur because configured resources are highly limited. The LTE eNodeB forwarding communications technology performs communication by using a Uu interface. Therefore, reliability is high, but a transmission latency is relatively high and a relatively large quantity of resources are occupied because UE needs to first send data to an eNodeB, and then the eNodeB forwards the data to other UE. It can be learned that, the communication requirement of the V2V service may not be met regardless of whether the user equipment performs the V2V communication by using the PC5 interface or the Uu interface.

SUMMARY

Embodiments of the present disclosure provide a V2X service message sending method and an apparatus, to flexibly perform a V2X service.

According to a first aspect, a V2X service message sending method is provided, including:

determining, by a terminal device, a communication path for a V2X service, where the communication path is selected from at least two communication paths, the at least two communication paths include a first communication path and a second communication path, the first communication path is a communication path on which communication is performed by using a PC5 interface, and the second communication path is a communication path on which communication is performed by using a Uu interface; and sending, by the terminal device, a message of the V2X service by using the communication path.

The terminal device can determine the communication path for the V2X service, and the communication path is selected from the at least two communication paths, so that the terminal device can flexibly select a communication path for the V2X service when sending the message of the V2X service. It should be noted that the V2X service is not specifically limited in this embodiment of the present disclosure. The technical solutions in this embodiment of the present disclosure are applicable to any V2X service that can use the first communication path or the second communication path to perform communication. For example, the V2X service may be a V2V service, a V2P service, or a V2I service, or may be a new V2X service.

In one embodiment, determining, by a terminal device, a communication path for a V2X service includes:

receiving, by the terminal device, indication information from a network device, where the indication information is used to indicate the communication path for the V2X service, and the communication path indicated by the indication information is selected by the network device from the at least two communication paths; and determining, by the terminal device, the communication path based on the indication information.

The network device selects the communication path for the V2X service of the terminal device, and the terminal device does not need to self-select the communication path, so that a processing resource of the terminal device is saved. In addition, the network device selects a communication path for a terminal device in a coverage area, so that the network device can schedule communication paths of all terminal devices in the coverage area.

In one embodiment, before determining, by a terminal device, a communication path for a V2X service, the method further includes:

sending, by the terminal device, first identification information to the network device, where the first identification information is used to request the network device to indicate a communication path for the V2X service. In one embodiment, within a predetermined time period after the terminal device sends the identification information, if receiving no indication information from the network device, the terminal device stops performing the V2X service, or the terminal device selects the communication path from the at least two communication paths.

In one embodiment, before determining, by a terminal device, a communication path for a V2X service, the method further includes:

sending, by the terminal device, a notification message to the network device. For example, the notification message includes information about the V2X service or status information of the terminal device. In this case, before determining the communication path for the V2X service, the terminal device reports the information about the V2X service or the status information of the terminal device to the network device.

It should be noted that in this embodiment of the present disclosure, the notification message sent by the terminal device to the network device may include various related information. This is not limited in this embodiment of the present disclosure.

In one embodiment, before determining, by a terminal device, a communication path for a V2X service, the method further includes:

sending, by the terminal device, message type information of the V2X service to the network device; and/or sending, by the terminal device, radio environment measurement information of the first communication path and/or radio environment measurement information of the second communication path to the network device.

In one embodiment, the terminal device sends the radio environment measurement information of the first communication path and/or the radio environment measurement information of the second communication path to the network device by using a radio resource control (RRC) dedicated message.

The terminal device sends the message type information of the V2X service, or the radio environment measurement information of the first communication path and/or the radio environment measurement information of the second communication path to the network device, so that the network device can select a more suitable communication path, for example, select a more reliable or lower-latency communication path, from the at least two communication paths based on the foregoing information, to send the message of the V2X service.

In one embodiment, receiving, by the terminal device, indication information from the network device includes:

receiving, by the terminal device, the indication information by using an RRC dedicated message sent by the network device. For example, the RRC dedicated message sent by the network device is a connection reconfiguration message RRCConnectionReconfiguration.

In one embodiment, the communication path indicated by the indication information is the first communication path; and before sending, by the terminal device, a message of the V2X service by using the communication path, the method further includes:

receiving, by the terminal device, configuration information of a D2D direct communication resource pool from the network device, where the D2D direct communication resource pool is configured for the first communication path.

In one embodiment, determining, by a terminal device, a communication path for a V2X service includes:

selecting, by the terminal device, the communication path from the at least two communication paths.

In one embodiment, selecting, by the terminal device, the communication path from the at least two communication paths may include: selecting, by the terminal device, the communication path from the at least two communication paths based on message type information of the V2X service; or selecting, by the terminal device, the communication path from the at least two communication paths based on radio environment measurement information of the first communication path and/or radio environment measurement information of the second communication path.

The terminal device selects the communication path from the at least two communication paths, without sending a request message to the network device to request the network device to select the communication path, so that a network resource can be saved. Further, the terminal device can select a more suitable communication path, for example, select a more reliable or lower-latency communication path, from the at least two communication paths based on the foregoing information, to send the message of the V2X service.

In one embodiment, before determining, by a terminal device, a communication path for a V2X service, the method further includes: sending, by the terminal device, second identification information to a network device, where the second identification information is used to request the network device to configure a D2D direct communication resource pool for the first communication path;

receiving, by the terminal device, configuration information of the D2D direct communication resource pool from the network device; and establishing, by the terminal device, a communication connection that is based on the second communication path.

Before the terminal device determines the communication path for the V2X service, the terminal device establishes the first communication path and the second communication path for the V2X service. In other words, the first communication path and the second communication path exist in parallel. In this way, after the terminal device determines the communication path for the V2X service, if the determined communication path is the established first communication path or second communication path, the terminal device may directly send the message of the V2X service by using the determined communication path. This reduces a message sending latency.

In one embodiment, the receiving, by the terminal device, configuration information of the D2D direct communication resource pool from the network device includes:

receiving, by the terminal device, the configuration information from the network device by using an RRC dedicated message.

In one embodiment, the D2D direct communication resource pool includes a dedicated resource pool.

The dedicated resource pool is similar to a resource pool in the prior art. The dedicated resource pool is also a set of time and frequency resources used for wireless communication, but the dedicated resource pool is a resource pool dedicated for the V2X service. Namely, the dedicated resource pool can be used only for the V2X service and cannot be used for other services. The dedicated resource pool that can be used only for the V2X service is configured for the V2X service, so that the terminal device can obtain a resource for the V2X service in time.

In one embodiment, sending, by the terminal device, first identification information to the network device includes:

sending, by the terminal device, the first identification information to the network device by using an RRC dedicated message. For example, the RRC dedicated message used to send the identification information to the network device is D2D user information SidelinkUEInformation.

In one embodiment, sending, by the terminal device, second identification information to a network device includes:

sending, by the terminal device, the second identification information to the network device by using an RRC dedicated message. For example, the RRC dedicated message used to send the identification information to the network device is D2D user information SidelinkUEInformation.

In one embodiment, after determining, by a terminal device, a communication path for a V2X service, the method further includes:

determining, by the terminal device, that a communication path currently used for the V2X service is a communication path different from the communication path; and stopping, by the terminal device, using the currently used communication path.

When the communication path determined by the terminal device is different from the communication path currently used by the terminal device, the terminal device stops using the currently used communication path, and uses the determined communication path to send the message of the V2X service. In this way, the terminal device can flexibly select a communication path for the V2X service, and send the message of the V2X service by using the selected communication path.

In one embodiment, a condition for triggering the terminal device to determine a communication path for the V2X service includes at least one of the following:

the V2X service is initialized;

the message of the V2X service is discarded due to timeout;

load of the second communication path is greater than a first threshold; or the terminal device enters a coverage area of a wireless communications system.

When at least one of the foregoing trigger conditions is met, the terminal device may perform the corresponding step of determining the communication path for the V2X service, and then send the message of the V2X service by using the determined communication path. When the foregoing condition is met, usually, the V2X service needs to be performed or a communication environment is changed. Therefore, when the foregoing trigger condition is met, the terminal device performs the corresponding step of determining the communication path for the V2X service, so that the terminal device can flexibly select a communication path for the V2X service, and can further select a more suitable communication path, for example, select a more reliable or lower-latency communication path, from the at least two communication paths, to send the message of the V2X service.

According to a second aspect, a V2X service processing method is provided. For technical effects that can be obtained through embodiments of the method, refer to the foregoing corresponding descriptions, and the foregoing corresponding embodiments are also applicable to the second aspect and the embodiments of the second aspect. The method includes:

selecting, by the network device, a communication path from at least two communication paths, where the at least two communication paths include a first communication path and a second communication path, the first communication path is a communication path on which communication is performed by using a PC5 interface, and the second communication path is a communication path on which communication is performed by using a Uu interface; and sending, by the network device, indication information to a terminal device, where the indication information indicates that the communication path is a communication path of a V2X service.

The network device selects the communication path for the V2X service to be performed by the terminal device, and the terminal device does not need to self-select the communication path, so that a processing resource of the terminal device is saved. In addition, the network device selects a communication path for a terminal device in a coverage area, so that the network device can schedule communication paths of all terminal devices in the coverage area.

In one embodiment, before selecting, by the network device, a communication path from at least two communication paths, the method further includes:

receiving, by the network device, identification information from the terminal device, where the identification information is used to request the network device to indicate a communication path for the V2X service.

In one embodiment, before selecting, by the network device, a communication path from at least two communication paths, the method further includes:

receiving, by the network device, message type information of the V2X service from the terminal device; and the selecting, by the network device, a communication path from at least two communication paths includes:

selecting, by the network device, the communication path from the at least two communication paths based on the message type information of the V2X service.

In one embodiment, before selecting, by the network device, a communication path from at least two communication paths, the method further includes:

receiving, by the network device, radio environment measurement information of the first communication path and/or radio environment measurement information of the second communication path from the terminal device; and selecting, by the network device, a communication path from at least two communication paths includes:

selecting, by the network device, the communication path from the at least two communication paths based on the radio environment measurement information of the first communication path and/or the radio environment measurement information of the second communication path.

The network device selects a more suitable communication path, for example, selects a more reliable or lower-latency communication path, from the at least two communication paths based on the foregoing information, to send a message of the V2X service.

In one embodiment, the communication path is the first communication path; and during the sending, by the network device, indication information to the terminal device or after the sending, by the network device, indication information to the terminal device, the method further includes:

sending, by the network device, configuration information of a D2D direct communication resource pool to the terminal device, where the D2D direct communication resource pool is configured for the first communication path.

In one embodiment, the D2D direct communication resource pool includes a dedicated resource pool.

In one embodiment, receiving, by the network device, identification information from the terminal device includes:

receiving, by the network device, the identification information by using a radio resource control RRC dedicated message sent by the terminal device.

In one embodiment, sending, by the network device, indication information to the terminal device includes:

sending, by the network device, the indication information to the terminal device by using an RRC dedicated message.

In one embodiment, sending, by the network device, configuration information of a D2D direct communication resource pool to the terminal device includes:

sending, by the network device, the configuration information of the D2D direct communication resource pool to the terminal device by using an RRC dedicated message. For example, the RRC dedicated message used to send the configuration information to the terminal device is an RRC connection reconfiguration message RRCConnectionReconfiguration.

According to a third aspect, a terminal device is provided, including:

a processing module configured to determine a communication path for a V2X service, where the communication path is selected from at least two communication paths, the at least two communication paths include a first communication path and a second communication path, the first communication path is a communication path on which communication is performed by using a PC5 interface, and the second communication path is a communication path on which communication is performed by using a Uu interface; and a transceiver module configured to send a message of the V2X service by using the communication path.

In one embodiment, the transceiver module is configured to receive indication information from the network device, where the indication information is used to indicate the communication path for the V2X service, and the communication path indicated by the indication information is selected by the network device from the at least two communication paths; and the processing module is configured to determine the communication path based on the indication information.

In one embodiment, the transceiver module is further configured to: before receiving the indication information from the network device, send first identification information to the network device, where the first identification information is used to request the network device to indicate a communication path for the V2X service.

In one embodiment, the transceiver module is further configured to: before receiving the indication information from the network device, send message type information of the V2X service to the network device; and/or the transceiver module is further configured to: before receiving the indication information from the network device, send radio environment measurement information of the first communication path and/or radio environment measurement information of the second communication path to the network device.

In one embodiment, the transceiver module sends the radio environment measurement information of the first communication path and/or the radio environment measurement information of the second communication path to the network device by using a radio resource control RRC dedicated message.

In one embodiment, that the transceiver module receives indication information from the network device includes:

receiving, by the transceiver module, the indication information by using an RRC dedicated message sent by the network device. For example, the RRC dedicated message sent by the network device is a connection reconfiguration message RRCConnectionReconfiguration.

In one embodiment, the communication path indicated by the indication information is the first communication path; and the transceiver module is further configured to: before sending the message of the V2X service by using the communication path, receive configuration information of a D2D direct communication resource pool from the network device, where the D2D direct communication resource pool is configured for the first communication path.

In one embodiment, that a processing module determines a communication path for a V2X service includes:

selecting, by the processing module, the communication path from the at least two communication paths.

In one embodiment, the selecting, by the processing module, the communication path from the at least two communication paths may include:

selecting, by the processing module, the communication path from the at least two communication paths based on message type information of the V2X service; or selecting, by the processing module, the communication path from the at least two communication paths based on radio environment measurement information of the first communication path and/or radio environment measurement information of the second communication path.

In one embodiment, the transceiver module is further configured to: before the processing module determines the communication path for the V2X service, send second identification information to a network device, where the second identification information is used to request the network device to configure a D2D direct communication resource pool for the first communication path;

the transceiver module is further configured to: before the processing module determines the communication path for the V2X service, receive configuration information of the D2D direct communication resource pool from the network device; and the processing module is further configured to: before determining the communication path for the V2X service, establish a communication connection that is based on the second communication path.

In one embodiment, that the transceiver module receives configuration information of the D2D direct communication resource pool from the network device includes:

receiving, by the transceiver module, the configuration information by using an RRC dedicated message sent by the network device.

In one embodiment, the D2D direct communication resource pool includes a dedicated resource pool.

In one embodiment, that the transceiver module sends first identification information to the network device includes:

sending, by the terminal device, the first identification information to the network device by using an RRC dedicated message. For example, the RRC dedicated message used to send the identification information to the network device is D2D user information SidelinkUEInformation.

In one embodiment, that the transceiver module sends second identification information to a network device includes:

sending, by the transceiver module, the second identification information to the network device by using an RRC dedicated message. For example, the RRC dedicated message used to send the identification information to the network device is D2D user information SidelinkUEInformation.

In one embodiment, the processing module is further configured to: after determining the communication path for the V2X service, determine that a communication path currently used for the V2X service is a communication path different from the communication path; and the processing module is further configured to stop using the currently used communication path.

In one embodiment, a condition for triggering the processing module to determine the communication path for the V2X service includes at least one of the following:

the V2X service is initialized;

the message of the V2X service is discarded due to timeout;

load of the second communication path is greater than a first threshold; or the terminal device enters a coverage area of a wireless communications system.

According to a fourth aspect, a network device is provided, including:

a processing module configured to select a communication path from at least two communication paths, where the at least two communication paths include a first communication path and a second communication path, the first communication path is a communication path on which communication is performed by using a PC5 interface, and the second communication path is a communication path on which communication is performed by using a Uu interface; and a transceiver module configured to send indication information to a terminal device, where the indication information indicates that the communication path is a communication path of a V2X service.

In one embodiment, the transceiver module is further configured to: before the processing module selects the communication path from the at least two communication paths, receive identification information from the terminal device, where the identification information is used to request the network device to indicate a communication path for the V2X service.

In one embodiment, the transceiver module is further configured to: before the processing module selects the communication path from the at least two communication paths, receive message type information of the V2X service from the terminal device; and that a processing module selects a communication path from at least two communication paths includes:

selecting, by the processing module, the communication path from the at least two communication paths based on the message type information of the V2X service.

In one embodiment, the transceiver module is further configured to: before the processing module selects the communication path from the at least two communication paths, receive radio environment measurement information of the first communication path and/or radio environment measurement information of the second communication path from the terminal device; and that a processing module selects a communication path from at least two communication paths includes:

selecting, by the processing module, the communication path from the at least two communication paths based on the radio environment measurement information of the first communication path and/or the radio environment measurement information of the second communication path.

In one embodiment, the communication path is the first communication path; and the transceiver module is further configured to: when sending the indication information to the terminal device or after sending the indication information to the terminal device, send configuration information of a D2D direct communication resource pool to the terminal device, where the D2D direct communication resource pool is configured for the first communication path.

In one embodiment, the D2D direct communication resource pool includes a dedicated resource pool.

In one embodiment, that the transceiver module receives identification information from the terminal device includes:

receiving, by the transceiver module, the identification information by using a radio resource control RRC dedicated message sent by the terminal device.

In one embodiment, that the transceiver module sends indication information to the terminal device includes:

sending, by the transceiver module, the indication information to the terminal device by using an RRC dedicated message.

In one embodiment, that the transceiver module sends configuration information of a D2D direct communication resource pool to the terminal device includes:

sending, by the transceiver module, the configuration information of the D2D direct communication resource pool to the terminal device by using an RRC dedicated message. For example, the RRC dedicated message used to send the configuration information to the terminal device is an RRC connection reconfiguration message RRCConnectionReconfiguration.

In the embodiments of the present disclosure, the communication path determined for the V2X service is selected from the at least two communication paths, the at least two communication paths include the first communication path and the second communication path, the first communication path is the communication path on which communication is performed by using the PC5 interface, and the second communication path is the communication path on which communication is performed by using the Uu interface. Therefore, a communication path can be flexibly determined for the V2X service.

BRIEF DESCRIPTION OF DRAWINGS

FIG. 1 is a communication scenario diagram according to an embodiment;

FIG. 2 is a schematic flowchart of a V2X service message sending method according to an embodiment;

DESCRIPTION OF EMBODIMENTS

Figure 3:
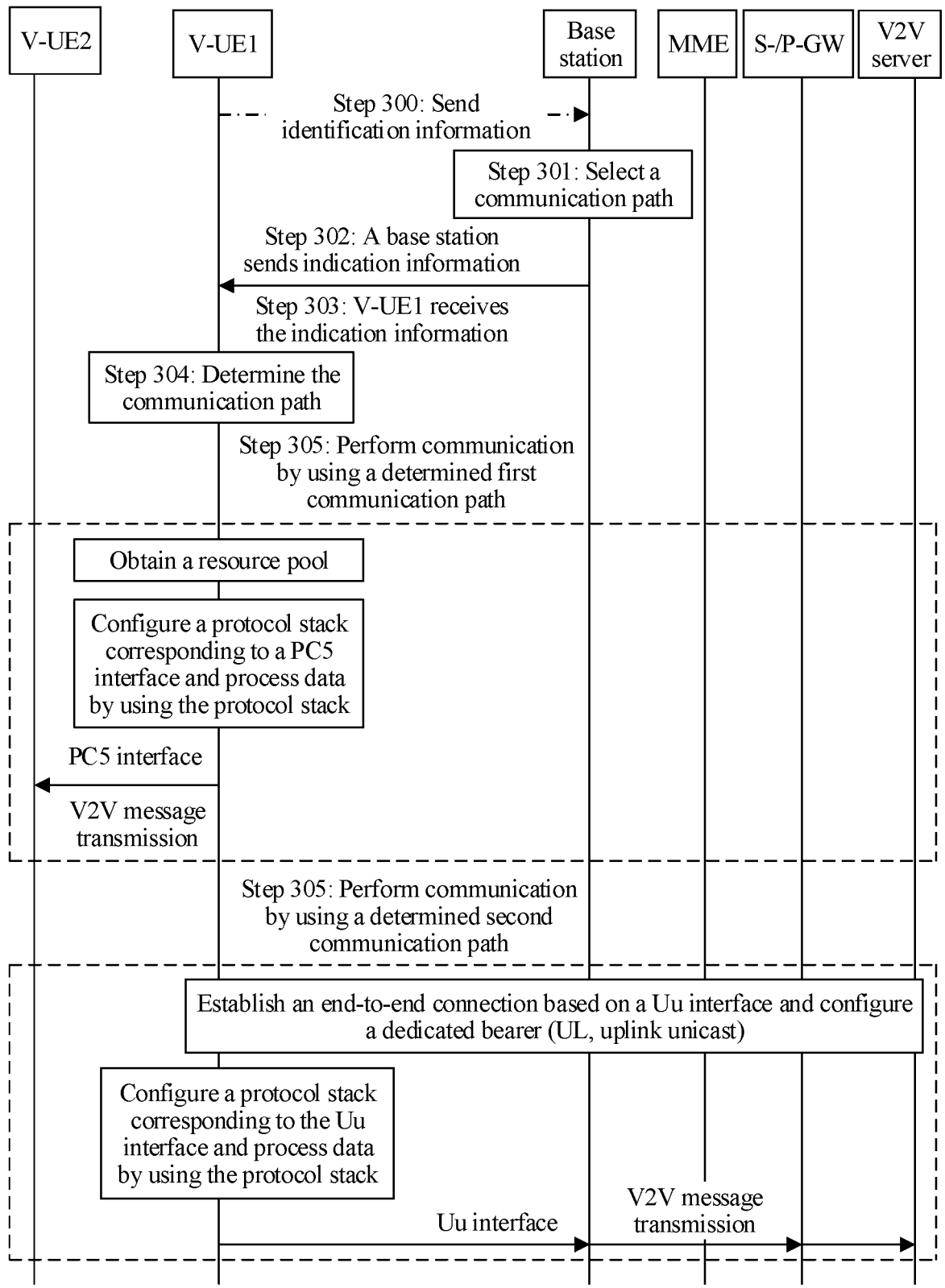
FIG. 3 is a schematic diagram of a first example according to an embodiment.

To enable a person skilled in the art to better understand the solutions in the embodiments of the present disclosure, the following further describes the embodiments of the present disclosure with reference to accompanying drawings and implementations.

The following first briefly describes communication processes of a D2D direct communications technology and an LTE eNodeB forwarding communications technology in V2V communications technologies.

D2D direct communications technology:

In the D2D direct communications technology, under control of a base station, user equipment can directly communicate with other user equipment in a broadcast manner. An air interface for direct communication between user equipment is referred to as a PC5 interface, and a corresponding radio link is referred to as a D2D sidelink (SL). On a communication path on which communication is performed by using the PC5 interface, the UE configures a radio protocol stack corresponding to the PC5 interface, processes data by using the protocol stack, and after obtaining a D2D direct communication resource, transmits the processed data by using the PC5 interface.

To prevent D2D direct communication from interfering with existing communication in an LTE system, the LTE system configures a resource pool dedicated for the D2D direct communication. The resource pool is a set of time and frequency resources used for wireless communication. Only a D2D direct communication resource in the D2D direct communication resource pool configured in the LTE system can be used to transmit D2D direct communication data over the PC5 interface.

It should be noted that in an existing D2D direct communications technology, UE obtains a D2D direct communication resource in two manners: a manner based on self-selection by UE and a manner based on scheduling by a base station. The manner based on self-selection by UE means that UE self-selects a resource from a D2D direct communication resource pool configured by a base station. The manner based on scheduling by a base station means that a base station selects a resource for UE from a D2D direct communication resource pool. The D2D direct communications technology has advantages such as a low latency and relatively low resource occupancy. However, if a D2D direct communication resource is limited and/or there is a relatively large traffic volume, due to relatively heavy load of a D2D direct communication resource pool, in the manner based on resource self-selection by UE, collisions of data transmitted by UE frequently occur, causing severe interference to data transmission between UEs. This greatly affects communication performance. In the manner based on scheduling by a base station, data transmission congestion occurs because it is difficult to obtain sufficient transmission resources in time for data to be transmitted by UE, forcing the UE to discard a data packet that cannot be transmitted in time. This severely affects a user service environment.

LTE eNodeB forwarding communications technology:

In the LTE eNodeB forwarding communications technology, UE first sends a V2V message to an eNodeB, and then the eNodeB sends the V2V message to other UE for receiving. An air interface for uplink transmission or downlink transmission between the UE and the eNodeB is referred to as a Uu interface. On a communication path on which communication is performed by using the Uu interface, the UE sends the V2V message to the eNodeB in an uplink (UL) unicast manner, and the eNodeB sends the V2V message to the other UE in a downlink (DL) broadcast manner. In one embodiment, the UE configures a radio bearer part of the Uu interface, processes data by using a radio protocol stack corresponding to the Uu interface, configures, by using a mobility management entity (MME), a core network bearer part: the eNodeB→a serving gateway (S-GW)/PDN gateway (P-GW)→a V2V server, and transmits the processed data on an uplink resource of an LTE system by using the Uu interface.

The LTE eNodeB forwarding communications technology uses a manner of centralized resource scheduling by an eNodeB, and an eNodeB schedules mutually orthogonal radio resources for UEs. This effectively resolves a problem of interference to communication between UEs, and is a transmission manner with relatively high reliability. However, in the LTE eNodeB forwarding communications technology, transmit end UE needs to first send data to an eNodeB by using an uplink resource, and then the eNodeB needs to forward the data to receive end UE by using a downlink resource. Only in this way, communication and an information exchange between the UEs can be implemented. The LTE eNodeB forwarding communications technology has lower resource utilization and a higher latency compared with the D2D direct communications technology that allows direct communication between UEs.

Based on the foregoing descriptions and advantage and disadvantage analyses of the existing V2V communications technologies, the embodiments of the present disclosure provide a V2X service message sending method and an apparatus, to flexibly send a message of a V2X service.

FIG. 1 is a communication scenario diagram according to an embodiment. It should be noted that the communication scenario diagram is merely for an illustration purpose, and an application scope of the present disclosure is not limited thereto. A V2V service in a V2X service is used as an example. As shown in FIG. 1, the communication scenario diagram includes vehicle-user equipment V-UE1 to V-UE6 and an eNodeB. Certainly, the communication scenario diagram may further include a core network bearer part including an MME, an S-GW/P-GW, a V2V server, and the like. This embodiment of the present disclosure is not limited thereto. In the communication scenario diagram, V2V communication may be performed between vehicle-user equipment V-UEs. For example, the vehicle-user equipment V-UE1 may perform V2V communication with other vehicle-user equipment by using an LTE eNodeB forwarding communications technology. The V-UE1 uploads a V2V message to an eNodeB in a UL unicast manner by using a Uu interface, and the eNodeB broadcasts the V2V message to the other vehicle-user equipment in a DL broadcast manner. For example, the vehicle-user equipment V-UE4 may perform V2V communication with other vehicle-user equipment by using a D2D direct communications technology. The V-UE4 broadcasts a V2V message to the other vehicle-user equipment through a D2D sidelink SL by using a PC5 interface.

It should be noted that although the V2V service is used as an example in the foregoing part to describe the V2X service, a person skilled in the art should know that this embodiment of the present disclosure is not only applicable to the V2V service, but also applicable to other V2X services, such as a V2I service, a V2P service, and a new V2X service.

A terminal device in the embodiments of the present disclosure may be a device that provides voice and/or data connectivity for a user, a handheld device with a wireless connection function, or another processing device connected to a wireless modem. The terminal device may communicate with one or more core networks by using a radio access network (RAN). The terminal device may be a mobile terminal such as a mobile phone (also referred to as a "cellular" phone) or a computer with a mobile terminal. For example, the terminal device may be a portable, pocketsized, handheld, computer built-in, or in-vehicle mobile apparatus (for example, vehicle-user equipment V-UE) that exchanges voice and/or data with the radio access network. For example, the terminal device is a device such as a personal communication service (PCS) phone, a cordless telephone set, a Session Initiation Protocol (SIP) phone, a wireless local loop (WLL) station, or a personal digital assistant (PDA). The terminal device may also be referred to as a system, a subscriber unit, a subscriber station, a mobile station, a mobile, a remote station, an access point, a remote terminal, an access terminal, a user terminal, a user agent, a user device, or user equipment.

A network device in the embodiments of the present disclosure may be a base station or an access node, or may be a device that communicates with the terminal device over an air interface in an access network by using one or more sectors. The base station may be configured to mutually convert a received over-the-air frame and an IP packet, and serves as a router between the terminal device and a remaining part of the access network. The remaining part of the access network may include an Internet Protocol (IP) network. The base station may further coordinate attribute management of an air interface. For example, the base station may be a base transceiver station (BTS) in the GSM or CDMA, may be a NodeB in WCDMA, or may be an evolved NodeB (eNB or e-NodeB) in LTE. This is not limited in this application.

The following describes, with reference to specific embodiments, how to flexibly perform a V2X service in the embodiments of the present disclosure.

FIG. 2 is a flowchart of a V2X service message sending method according to an embodiment. As shown in FIG. 2, the method includes the following steps:

Step 201: A terminal device determines a communication path for a V2X service, where the communication path is selected from at least two communication paths, the at least two communication paths include a first communication path and a second communication path, the first communication path is a communication path on which communication is performed by using a PC5 interface, and the second communication path is a communication path on which communication is performed by using a Uu interface.

Step 202: The terminal device sends a message of the V2X service by using the communication path.

In one embodiment, the terminal device sends the message of the V2X service by using the determined communication path, and the determined communication path is selected from the at least two communication paths. In this way, a communication path is flexibly selected for a V2X service.

For example, in one embodiment, the communication path determined by the terminal device for the V2X service is the first communication path, namely, the communication path on which communication is performed by using the PC5 interface. Therefore, the terminal device sends the message of the V2X service by using the first communication path. In this case, the terminal device configures a radio protocol stack corresponding to the PC5 interface, processes data by using the protocol stack, and obtains a D2D direct communication resource to transmit the processed data. In one embodiment, the terminal device obtains the D2D direct communication resource from a D2D direct communication resource pool in a manner that is based on self-selection, or the terminal device obtains the D2D direct communication resource from a D2D direct communication resource pool in a manner that is based on scheduling by a base station.

In one embodiment, the resource pool from which the terminal device obtains the D2D direct communication resource includes a dedicated resource pool. In the prior art, a D2D direct communication resource used by a terminal device to perform D2D direct communication comes from a resource pool that is configured by an LTE system and that is dedicated for D2D direct communication. The resource pool is actually a shared resource pool, and the resource pool can be used by a plurality of V2X services and a plurality of other D2D communication services. When the terminal device obtains the D2D direct communication resource from the resource pool in the manner that is based on self-selection, due to relatively heavy load of the resource pool, collisions of data transmitted by the terminal device frequently occur, causing severe interference to data transmission between terminal devices. When the terminal device obtains the D2D direct communication resource from the resource pool in the manner that is based on scheduling by a base station, it cannot be ensured that the terminal device can obtain sufficient transmission resources in time, either. Therefore, in one embodiment, the dedicated resource pool may be configured for the V2X service. Similar to the resource pool in the prior art, the dedicated resource pool is also a set of time and frequency resources used for wireless communication, but the dedicated resource pool is a resource pool dedicated for the V2X service. In other words, the dedicated resource pool can be used only for the V2X service and cannot be used for other D2D services. Therefore, when sending the message of the V2X service by using the first communication path, the terminal device may obtain the D2D direct communication resource from the dedicated resource pool in the manner that is based on self-selection, or may obtain the D2D direct communication resource from the dedicated resource pool in the manner that is based on scheduling by a base station. Certainly, the terminal device may obtain the D2D direct communication resource from a shared resource pool and the dedicated resource pool. For example, the terminal device preferably obtains the D2D direct communication resource from the dedicated resource pool, or obtains the D2D direct communication resource from both the shared resource pool and the dedicated resource pool.

In one embodiment, when obtaining the D2D direct communication resource from the shared resource pool and/or the dedicated resource pool in the manner that is based on scheduling by a base station, the terminal device may receive, from a network device, configuration information for configuring the shared resource pool and/or the dedicated resource pool. For example, the terminal device receives the configuration information by using a radio resource control RRC connection reconfiguration message RRCConnectionReconfiguration sent by the network device, or may receive the configuration information by using another RRC dedicated message.

In another embodiment, the communication path determined by the terminal device for the V2X service is the second communication path, namely, the communication path on which communication is performed by using the Uu interface. Therefore, the terminal device sends the message of the V2X service by using the second communication path. In this case, the terminal device configures a radio protocol stack corresponding to the Uu interface, processes data by using the protocol stack, establishes an end-to-end connection between the terminal device and a network device, configures a dedicated bearer, and transmits the processed data by using the dedicated bearer.

In one embodiment, after step 201, the method further includes: determining, by the terminal device, that a communication path currently used for the V2X service is a communication path different from the communication path; and stopping, by the terminal device, using the currently used communication path. To be specific, when the communication path determined by the terminal device is different from the communication path currently used by the terminal device, the terminal device stops using the communication path currently used by the terminal device, and sends the message of the V2X service by using the determined communication path.

In one embodiment, a condition for triggering step 201 includes at least one of the following:

the V2X service is initialized;

the message of the V2X service is discarded due to timeout;

load of the second communication path is greater than a first threshold; or the terminal device enters a coverage area of a wireless communications system.

In one embodiment, when at least one of the foregoing trigger conditions is met, the terminal device may perform the corresponding step of determining the communication path for the V2X service, and then send the message of the V2X service by using the determined communication path. When the foregoing condition is met, usually, the V2X service needs to be performed or a communication environment is changed. Therefore, when the foregoing trigger condition is met, the terminal device performs the corresponding step of determining the communication path for the V2X service, so that the terminal device can flexibly select a communication path for the V2X service, and can further select a more suitable communication path, for example, select a more reliable or lower-latency communication path, from the at least two communication paths, to send the message of the V2X service. The following describes how to select a more suitable communication path.

In one embodiment, before step 201, the method further includes:

sending, by the terminal device, identification information to the network device, where the identification information is used to request the network device to indicate a communication path for the V2X service. In other words, the terminal device requests the network device to select a communication path for the V2X service. In one embodiment, within a predetermined time period after the terminal device sends the identification information, if receiving no indication information that is sent by the network device and that indicates a communication path for the V2X service, the terminal device stops performing the V2X service, or the terminal device self-selects the communication path from the at least two communication paths.

In one embodiment, before step 201, the method further includes:

sending, by the terminal device, a notification message to the network device. For example, the notification message includes information about the V2X service or status information of the terminal device. In this case, before determining the communication path for the V2X service, the terminal device reports the information about the V2X service or the status information of the terminal device to the network device.

It should be noted that in this embodiment of the present disclosure, the notification message sent by the terminal device to the network device may include various related information. This is not limited in this embodiment of the present disclosure.

In one embodiment, the communication path may be selected by the network device from the at least two communication paths. FIG. 3 is a flowchart of a V2X service message sending method according to an embodiment. In FIG. 3, a V2V service is used as an example for description. As shown in FIG. 3, the method includes the following steps.

Step 301: A network device selects a communication path from at least two communication paths, where the at least two communication paths include a first communication path and a second communication path, the first communication path is a communication path on which communication is performed by using a PC5 interface, and the second communication path is a communication path on which communication is performed by using a Uu interface.

In one embodiment, the network device may randomly select the communication path from the at least two communication paths.

In one embodiment, the network device selects the communication path from the at least two communication paths based on message type information of a V2X service. In this case, before the network device selects the communication path from the at least two communication paths, the network device receives the message type information of the V2X service from a terminal device. For example, the network device receives the message type information by using an independent RRC dedicated message, or receives the message type information by using RRC SidelinkUEInformation that includes the foregoing identification information. This is not limited in this embodiment of the present disclosure. For example, the message type information of the V2X service may be a common service message type of the Internet of Vehicles, such as a cooperative awareness message (CAM), a decentralized environmental notification message (DENM), a basic safety message (BSM), and telematics. This is not limited in this embodiment of the present disclosure.

After receiving the message type information of the V2X service, the network device selects, based on the message type information, a communication path corresponding to the message type information. The communication path is selected based on the message type information of the V2X service, so that a more suitable communication path can be flexibly selected for the V2X service based on a feature and a requirement of the V2X service. For example, the first communication path may be selected for a V2X service with a low-latency requirement, and the second communication path may be selected for a V2X service with a high-reliability requirement. This is not limited in this embodiment of the present disclosure.

In one embodiment, the network device selects the communication path from the at least two communication paths based on radio environment measurement information of the first communication path and/or radio environment measurement information of the second communication path. In this case, before the network device selects the communication path from the at least two communication paths, the network device receives the radio environment measurement information of the first communication path and/or the radio environment measurement information of the second communication path from the terminal device. For example, the network device receives the radio environment measurement information of the first communication path and/or the radio environment measurement information of the second communication path by using RRCSidelinkUEInformation that includes the foregoing identification information, or receives the radio environment measurement information of the first communication path and/or the radio environment measurement information of the second communication path by using an RRC dedicated message MeasurementReport, or receives the radio environment measurement information of the first communication path and/or the radio environment measurement information of the second communication path from the terminal device by using another independent RRC dedicated message. This is not limited in this embodiment of the present disclosure.

In one embodiment, the radio environment measurement information that is of the communication path and that is sent by the terminal device to the network device may be read from an appropriate storage location, or may be obtained through measurement. After receiving the radio environment measurement information of the first communication path and/or the radio environment measurement information of the second communication path, the network device selects the communication path based on the radio environment measurement information of the first communication path and/or the radio environment measurement information of the second communication path. For example, the radio environment measurement information of the first communication path may be information about resource pool load of the PC5 interface, and the radio environment measurement information of the second communication path may be cellular link quality of the Uu interface. The network device selects the first communication path when the resource pool load of the PC5 interface is less than a first threshold and/or the cellular link quality of the Uu interface is relatively poor. Alternatively, the network device selects the second communication path when the resource pool load of the PC5 interface is greater than the first threshold and/or the cellular link quality of the Uu interface is relatively good. For the resource pool load of the PC5 interface, for example, system information broadcast by an access network device may be received, to obtain a time-frequency location of a D2D direct communication resource pool of the PC5 interface; and it is detected, on a resource included in the D2D direct communication resource pool, whether radio signal strength reaches a threshold, to determine whether the resource is occupied, and then the resource pool load is determined based on an occupation proportion of resources in the resource pool. It should be noted that a specific form of radio environment measurement information of each communication path is not limited in this embodiment of the present disclosure, provided that the radio environment measurement information of each communication path reflects a status of the communication path. The communication path is selected based on the radio environment measurement information of the first communication path and/or the radio environment measurement information of the second communication path, so that a status of each communication path can be learned based on the radio environment measurement information of each communication path, and then a more suitable communication path can be selected for the V2X service. For example, a lower-latency and/or higher-reliability communication path can be selected for the V2X service.

Step 302: The network device sends indication information to a terminal device, where the indication information indicates that the communication path is a communication path of a V2X service.

The network device sends, to the terminal device by using the indication information, the communication path selected for the V2X service. For example, the network device sends the indication information by using a connection reconfiguration message RRCConnectionReconfiguration, or sends the indication information by using another independent RRC dedicated message. This is not limited in this embodiment of the present disclosure.

Step 303: The terminal device receives the indication information from the network device, where the indication information is used to indicate the communication path for the V2X service.

Step 304: The terminal device determines, as the communication path, the communication path indicated by the indication information.

Step 305: The terminal device sends a message of the V2X service by using the communication path.

For example, the communication path determined by the terminal device for the V2X service is the first communication path, and step 305 may include: obtaining configuration information of a resource pool from the network device, configuring a protocol stack corresponding to the PC5 interface, processing data by using the protocol stack, and sending the processed data. For example, the communication path determined by the terminal device for the V2X service is the second communication path, and step 305 may include: establishing an end-to-end connection based on the Uu interface, configuring a dedicated bearer, configuring a protocol stack corresponding to the Uu interface, processing data by using the protocol stack, and sending the processed data.

In one embodiment, after the terminal device determines the communication path for the V2X service, for an implementation of sending the message of the V2X service by using the communication path, refer to the descriptions in the foregoing embodiment. Details are not described herein again for brevity sake.

In one embodiment, before step 301, the method further includes:

Step 300: The terminal device sends identification information to the network device, where the identification information is used to request the network device to indicate a communication path for the V2X service.

After receiving the identification information that is used to request the network device to select a communication path for the V2X service, in response to the identification information, the network device selects the communication path from the at least two communication paths as the communication path of the V2X service.

When determining the communication path for the V2X service, the terminal device may send the identification information to request the network device to select a communication path for the V2X service. In one embodiment, the identification information may be an independent RRC dedicated message, or may be added as a field to RRCSidelinkUEInformation used for D2D direct communication. In response to the identification information, the network device performs step 301 of selecting a communication path for the V2X service. Certainly, the network device may self-select the communication path for the V2X service at a random time, and send a selection result to the terminal device by using indication information.

In the foregoing manner, the terminal device determines, as the communication path of the V2X service, the communication path selected by the network device, without self-selecting a communication path for the V2X service, so that a processing resource of the terminal device is saved. In addition, the network device selects a communication path for a terminal device in a coverage area, so that the network device can schedule communication paths of all terminal devices in the coverage area.

Figure 4:
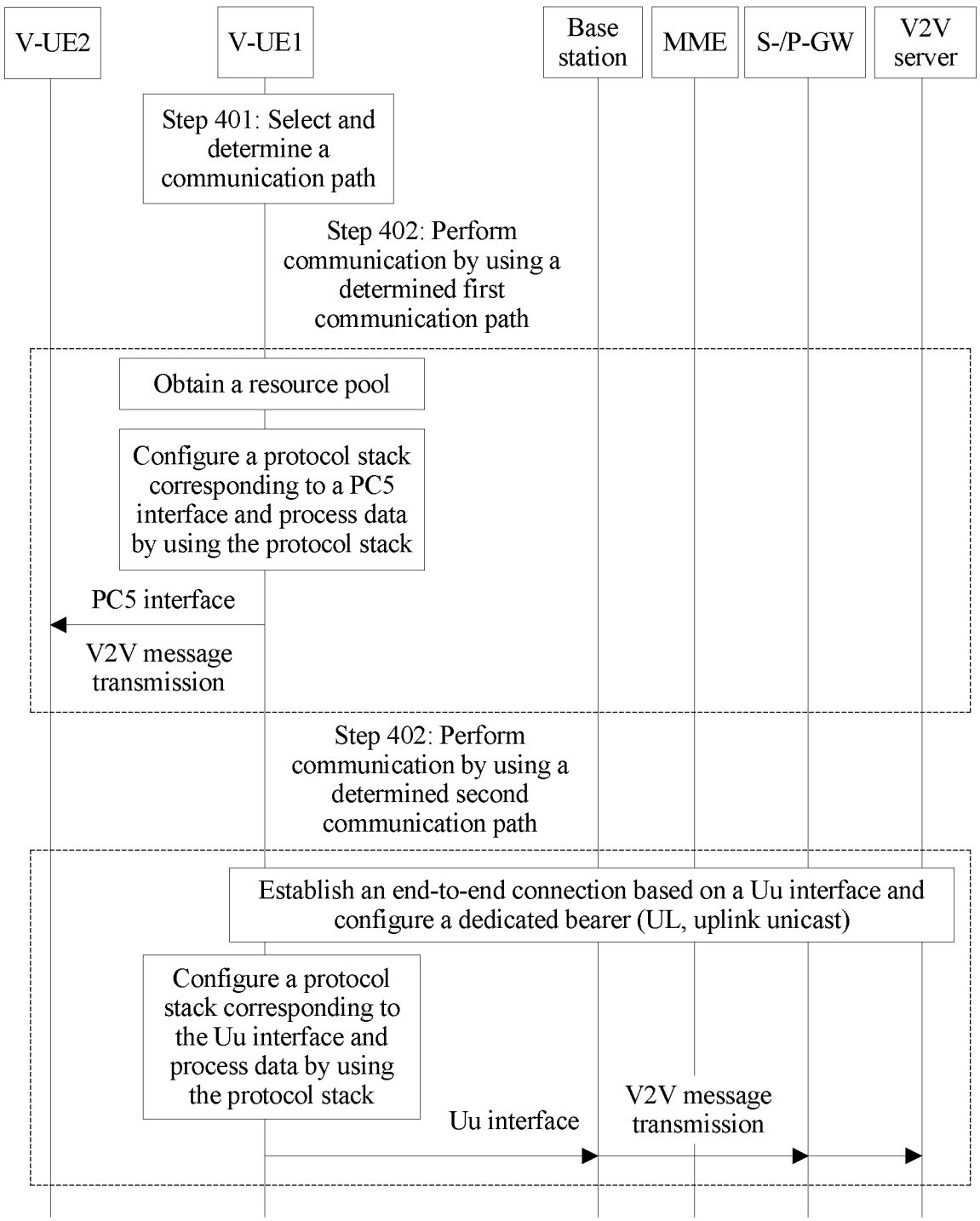
FIG. 4 is a schematic diagram of a second example according to an embodiment.

In one embodiment, the communication path may be selected by the terminal device from the at least two communication paths. FIG. 4 is a flowchart of a V2X service message sending method according to an embodiment of the present disclosure. As shown in FIG. 4, the method includes the following steps.

Step 401: A terminal device determines a communication path for a V2X service, where the communication path is selected by the terminal device from at least two communication paths, the at least two communication paths include a first communication path and a second communication path, the first communication path is a communication path on which communication is performed by using a PC5 interface, and the second communication path is a communication path on which communication is performed by using a Uu interface.

Step 402: The terminal device sends a message of the V2X service by using the communication path.

For example, the communication path determined by the terminal device for the V2X service is the first communication path, and step 402 may include: obtaining configuration information of a resource pool from the network device, configuring a protocol stack corresponding to the PC5 interface, processing data by using the protocol stack, and sending the processed data. For example, the communication path determined by the terminal device for the V2X service is the second communication path, and step 402 may include: establishing an end-to-end connection based on the Uu interface, configuring a dedicated bearer, configuring a protocol stack corresponding to the Uu interface, processing data by using the protocol stack, and sending the processed data.

In one embodiment, after the terminal device determines the communication path for the V2X service, for an implementation of sending the message of the V2X service by using the communication path, refer to the descriptions in the foregoing embodiment. Details are not described herein again for brevity sake.

In the foregoing manner, the terminal device selects the communication path from the at least two communication paths, to send the message of the V2X service, so that a communication path can be more flexibly and efficiently determined for the V2X service.

Figure 5:
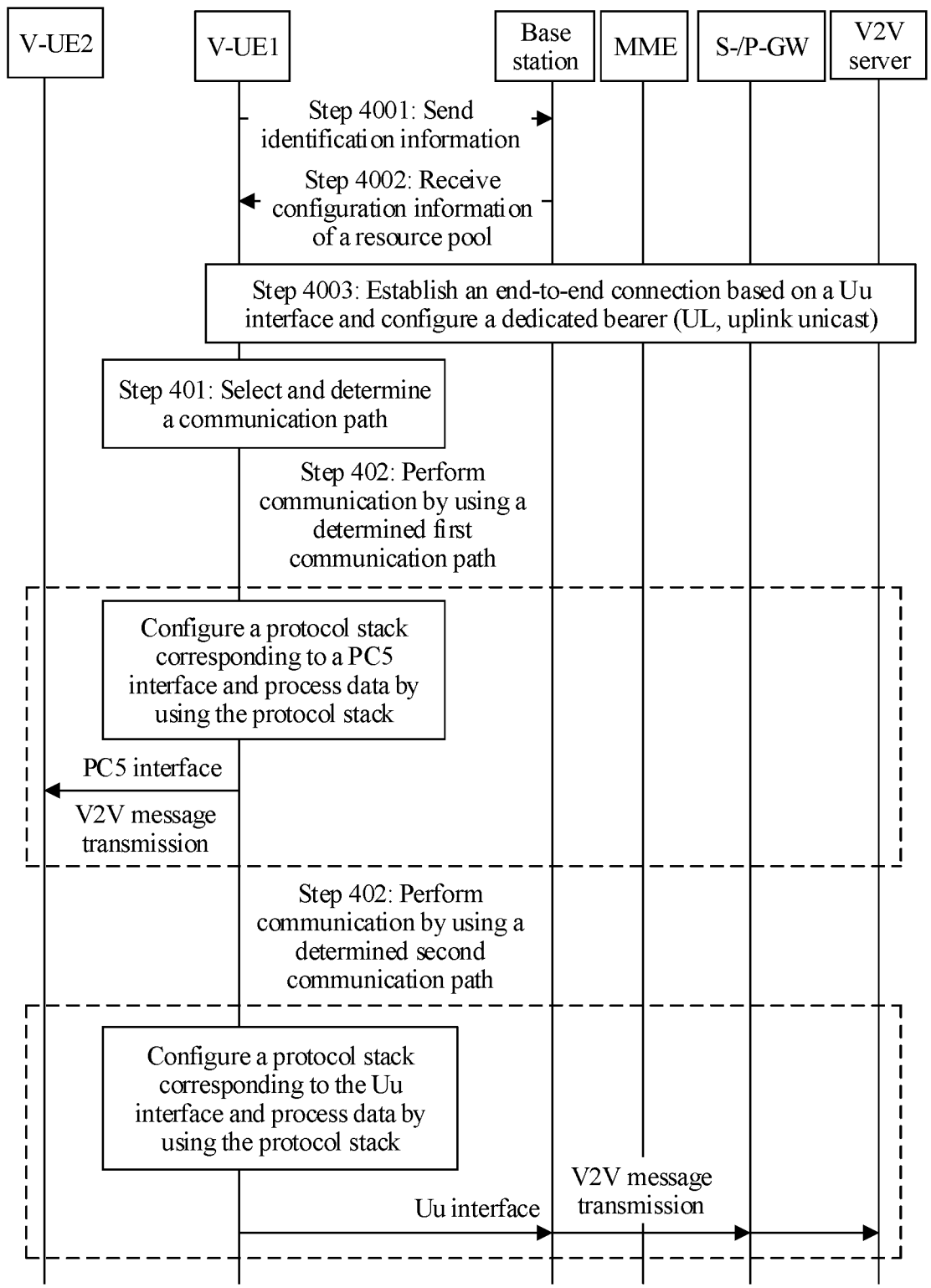
FIG. 5 is a schematic diagram of a third example according to an embodiment.

In one embodiment, as shown in FIG. 5, before step 401, the method may further include the following steps.

Step 4001: The terminal device sends identification information to a network device, where the identification information is used to request the network device to configure a D2D direct communication resource pool for the first communication path.

Before determining the communication path for the V2X service, the terminal device may send the identification information to request the network device to configure a D2D direct communication resource pool for the first communication path. In one embodiment, the identification information may be an independent RRC dedicated message, or may be added as a field to RRCSidelinkUEInformation used for D2D direct communication.

Step 4002: The terminal device receives configuration information of the D2D direct communication resource pool from the network device.

After receiving the identification information, in response to the identification information, the network device configures the D2D direct communication resource pool for the first communication path, and sends the configuration information to the terminal device. In one embodiment, the network device sends the configuration information by using an RRC connection reconfiguration message RRCConnectionReconfiguration, or may send the configuration information by using another RRC dedicated message.

Step 4003: The terminal device establishes a communication connection that is based on the second communication path and configures a dedicated bearer.

After performing steps 4001 to 4003, the terminal device establishes the first communication path and the second communication path for the V2X service. In other words, the first communication path and the second communication path exist in parallel.

It should be noted that there is no strict time sequence relationship between step 4003 in which the terminal device establishes the communication connection that is based on the second communication path and configures the dedicated bearer and step 4001 of sending the identification information that is used to request the network device to configure the D2D direct communication resource pool for the first communication path. For example, the terminal device may perform step 4001 before step 4003, perform step 4003 before step 4001, or simultaneously perform step 4001 and step 4003.

Then, the terminal device performs step 401 and step 402 in the foregoing embodiment. In other words, after the terminal device establishes the first communication path and the second communication path for the V2X service, the terminal device determines the communication path for the V2X service. In one embodiment, for an implementation of selecting the communication path, refer to the descriptions in the foregoing embodiment. Details are not described herein again for brevity sake.

It should be noted that the terminal device has established the first communication path and the second communication path for the V2X service. Therefore, when the communication path determined by the terminal device for the V2X service is the first communication path or the second communication path, the terminal device may directly send the message of the V2X service by using the determined first communication path or second communication path.

In one embodiment, the terminal device may switch the determined communication path used to send the message of the V2X service to a communication path that is in the first communication path and the second communication path and that is different from the determined communication path used to send the message of the V2X service. For example, the terminal device establishes the first communication path and the second communication path, and the communication path determined by the terminal device for the V2X service is the first communication path. Therefore, the terminal device sends the message of the V2X service by using the first communication path. Then, the terminal device may switch the first communication path for performing the V2X service to the second communication path, to be specific, send the message of the V2X service by using the second communication path, and stop using the first communication path. In one embodiment, the terminal device may perform the switching step after a predetermined time period, or the terminal device may switch to the first communication path or the second communication path at a scheduled time, to send the message of the V2X service, or the terminal device detects that another communication path that is in the first communication path and the second communication path and that is different from the determined communication path used to send the message of the V2X service is more suitable for performing the V2X service. For how to determine a more suitable communication path, refer to the descriptions in the foregoing embodiment. Details are not described herein again for brevity sake.

In the foregoing manner, before the terminal device determines the communication path for the V2X service, the terminal device establishes the first communication path and the second communication path for the V2X service. Therefore, when the communication path determined by the terminal device for the V2X service is the first communication path or the second communication path, the terminal device may directly send the message of the V2X service by using the determined communication path. This has the following beneficial effect: The V2X service can be more quickly performed after the communication path for performing the V2X service is determined.

In one embodiment, the terminal device determines that a radio link failure (RLF) occurs, and the terminal device switches the second communication path currently used for the V2X service to another communication path. The first communication path is the communication path on which communication is performed by using the PC5 interface, and the second communication path is the communication path on which communication is performed by using the Uu interface. For example, the terminal device switches the second communication path currently used for the V2X service to the first communication path.

After the terminal device switches the second communication path currently used for the V2X service to the first communication path, the terminal device sends the message of the V2X service by using the first communication path. For example, the terminal device establishes the first communication path in advance, or the terminal device may obtain the D2D direct communication resource in a manner that is based on self-selection by UE or in a manner that is based on scheduling by a base station, and then send the message of the V2X service by using the first communication path. In one embodiment, the terminal device may obtain the D2D direct communication resource from an exceptional resource pool. The exceptional resource pool is a set of time and frequency resources used for wireless communication. For an implementation of sending the message of the V2X service by using the first communication path, refer to the descriptions in the foregoing embodiment. Details are not described herein again for brevity sake.

In the foregoing manner, when the terminal device sends the message of the V2X service by using the second communication path, after determining that an RLF occurs, the terminal device can switch the communication path, and send the message of the V2X service by using another communication path. This implements effective transmission when an RLF occurs.

To implement the foregoing embodiments, an embodiment of the present disclosure further provides a terminal device. It should be noted that the terminal device can perform the method in the foregoing embodiments. Therefore, for details of the terminal device, refer to the descriptions in the foregoing embodiments. For brevity, same content is not described below again.

Figure 6:
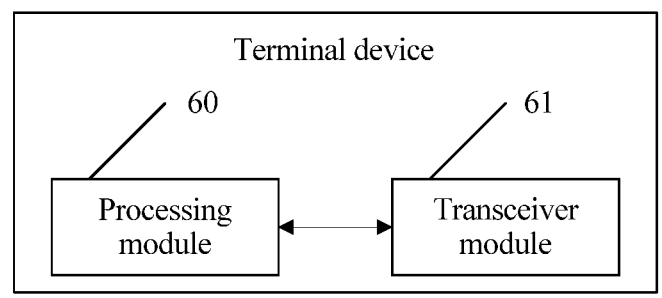
FIG. 6 is a schematic structural diagram of a terminal device according to an embodiment.

As shown in FIG. 6, the terminal device may include a processing module and a transceiver module, and the processing module and the transceiver module are communicatively connected. Certainly, the terminal device may further include a storage module and the like.

The processing module is configured to determine a communication path for a V2X service, where the communication path is selected from at least two communication paths, the at least two communication paths include a first communication path and a second communication path, the first communication path is a communication path on which communication is performed by using a PC5 interface, and the second communication path is a communication path on which communication is performed by using a Uu interface.

The transceiver module is configured to send a message of the V2X service by using the communication path.

In one embodiment, the communication path may be selected by a network device from the at least two communication paths.

In one embodiment, the processing module determines a communication path for a V2X service, where the communication path is selected from at least two communication paths includes:

the transceiver module sends identification information to the network device, where the identification information is used to request the network device to indicate a communication path for the V2X service;

the transceiver module receives indication information from the network device, where the indication information is used to indicate the communication path for the V2X service, and the communication path indicated by the indication information is selected from the at least two communication paths; and the processing module determines the communication path indicated by the indication information as the communication path.

In one embodiment, the communication path may be selected by the terminal device from the at least two communication paths.

In one embodiment, the processing module determines the communication path for the V2X service, and the communication path is selected by the processing module from the at least two communication paths.

In one embodiment, before determining the communication path for the V2X service, the terminal device establishes the first communication path and the second communication path for the V2X service. In other words, the first communication path and the second communication path exist in parallel.

In one embodiment, before the processing module determines the communication path for the V2X service, the following operations are further performed:

the transceiver module sends identification information to the network device, where the identification information is used to request the network device to configure a D2D direct communication resource pool for the first communication path;

the transceiver module receives configuration information of the D2D direct communication resource pool from the network device; and the processing module establishes a communication connection that is based on the second communication path.

It should be noted that for a specific implementation in which the terminal device determines the communication path and sends the message of the V2X service by using the communication path, refer to the descriptions in the method embodiments. This terminal device embodiment and the foregoing method embodiments are based on a same concept, and technical effects brought by this embodiment are the same as those brought by the method embodiments of the present disclosure. For specific content, refer to the descriptions in the method embodiments of the present disclosure. Details are not described herein again for brevity sake.

To implement the foregoing embodiments, an embodiment of the present disclosure further provides a network device. It should be noted that the network device can perform the method in the foregoing embodiments. Therefore, for details of the network device, refer to the descriptions in the foregoing embodiments. For brevity, same content is not described below again.

Figure 7:
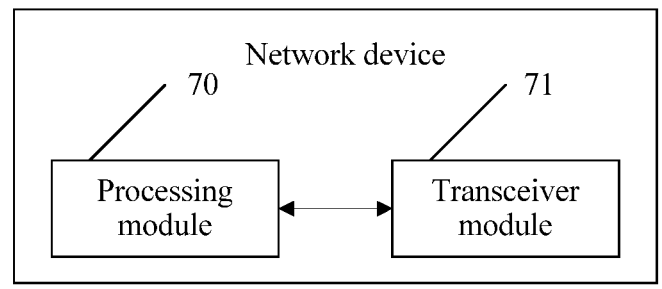
FIG. 7 is a schematic structural diagram of a network device according to an embodiment.

As shown in FIG. 7, the network device may include a processing module and a transceiver module, and the processing module and the transceiver module are communicatively connected. Certainly, the network device may further include a storage module and the like.

The transceiver module is configured to receive identification information from a terminal device, where the identification information is used to request the network device to indicate a communication path for a V2X service.

The processing module is configured to select a communication path from at least two communication paths, where the at least two communication paths include a first communication path and a second communication path, the first communication path is a communication path on which communication is performed by using a PC5 interface, and the second communication path is a communication path on which communication is performed by using a Uu interface.

The transceiver module is configured to send indication information to a terminal device, where the indication information indicates that the communication path is a communication path of a V2X service.

It should be noted that for a specific implementation in which the network device selects the communication path in response to the identification information, refer to the descriptions in the method embodiments. This network device embodiment and the foregoing method embodiments are based on a same concept, and technical effects brought by this embodiment are the same as those brought by the method embodiments of the present disclosure. For specific content, refer to the descriptions in the method embodiments of the present disclosure. Details are not described herein again for brevity sake.

It should be understood that in the embodiments of the present disclosure, the processing module may be implemented by at least one processor. The processor herein may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The sending module may be implemented by a transmitter or a transceiver. The receiving module may be implemented by a receiver or a transceiver. The transceiver module may be implemented by a transceiver. In addition, the network device and the terminal device in the foregoing embodiments of the present disclosure may further include a component such as a memory. The memory herein may include a read-only memory and a random access memory, and provide an instruction and data for a processor. A part of the memory may further include a nonvolatile random access memory. For example, the memory may further store device type information. The processor invokes instruction code in the memory, to control other modules of the network device and the terminal device in the embodiments of the present disclosure to perform the foregoing operations.

It should be understood that "an embodiment" or "an embodiment of the present disclosure" described in the whole specification means that particular features, structures, or characteristics related to the embodiment are included in at least one embodiment of the present disclosure. Therefore, "in an embodiment" or "in an embodiment of the present disclosure" that appears throughout the whole specification does not necessarily mean a same embodiment. Moreover, these particular features, structures, or characteristics may be combined in one or more embodiments in any suitable manner.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

In addition, the terms "system" and "network" in this specification may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments provided in this application, "B corresponding to A" indicates that B is associated with A, and B may be determined based on A. However, it should further be understood that determining B based on A does not mean that B is determined based on A only. Namely, B may be determined based on A and/or other information.

A person of ordinary skill in the art may be aware that, the units and algorithm steps in the examples described with reference to the embodiments disclosed in this specification can be implemented by electronic hardware, computer software, or a combination thereof. To clearly describe the interchangeability between the hardware and the software, composition and steps of each example have been generally described based on functions in the foregoing descriptions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In several embodiments provided in this application, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units; to be specific, may be located in one position, or may be distributed on a plurality of network units. Some or all of the units may be selected based on actual needs to achieve the objectives of the solutions in the embodiments.

When the integrated unit is implemented in a form of a software functional unit and is sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of the present disclosure. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of sending a vehicle-to-everything (V2X) service message, comprising:
    sending, by a terminal device, second identification information to a network device, wherein the second identification information is used to request the network device to configure a device-to-device (D2D) direct communication resource pool for a first communication path;
    receiving, by the terminal device, configuration information of the D2D direct communication resource pool from the network device;
    establishing, by the terminal device, a communication connection that is based on a second communication path;
    determining, by the terminal device, a communication path for a V2X service, wherein the communication path is selected from at least two communication paths, the at least two communication paths comprise the first communication path and the second communication path, the first communication path is a communication path on which communication is performed using a PC5 interface, and the second communication path is a communication path on which communication is performed using a Uu interface that is configured for a message of the V2X service independently of other Uu traffic; and
    sending, by the terminal device, the message of the V2X service using the communication path.

2. The method according to claim 1, wherein determining the communication path for the V2X service comprises:
    receiving, by the terminal device, indication information from the network device, wherein the indication information is used to indicate the communication path for the V2X service, and the communication path indicated by the indication information is selected by the network device from the at least two communication paths; and
    determining, by the terminal device, the communication path based on the indication information.

3. The method according to claim 1, further comprising: before determining the communication path for the V2X service,
    sending, by the terminal device, first identification information to the network device, wherein the first identification information is used to request the network device to indicate the communication path for the V2X service.

4. The method according to claim 1, further comprising: before determining the communication path for the V2X service,
    sending, by the terminal device, message type information of the V2X service to the network device; or
    sending, by the terminal device, radio environment measurement information of the first communication path, or radio environment measurement information of the second communication path to the network device.

5. The method according to claim 1,
    wherein the communication path indicated by the indication information is the first communication path; and
    further comprising: before sending the message of the V2X service using the communication path,
    receiving, by the terminal device, configuration information of the D2D direct communication resource pool from the network device, wherein the D2D direct communication resource pool is configured for the first communication path.

6. The method according to claim 1, wherein determining the communication path for the V2X service comprises:
    selecting, by the terminal device, the communication path from the at least two communication paths.

7. The method according to claim 6, wherein selecting the communication path from the at least two communication paths comprises:
    selecting, by the terminal device, the communication path from the at least two communication paths based on message type information of the V2X service; or
    selecting, by the terminal device, the communication path from the at least two communication paths based on radio environment measurement information of the first communication path, or radio environment measurement information of the second communication path.

8. The method according to claim 5, wherein the D2D direct communication resource pool comprises a dedicated resource pool.

9. The method according to claim 3, wherein sending the first identification information to the network device comprises:
    sending, by the terminal device, the first identification information to the network device using a first radio resource control (RRC) dedicated message.

10. An apparatus, comprising:
    a memory storing program instructions; and
    a processor coupled to the memory;
    wherein when executed by the processor, the instructions cause the processor to:
        send second identification information to a network device, wherein the second identification information is used to request the network device to configure a device-to-device (D2D) direct communication resource pool for the first communication path,
        receive configuration information of the D2D direct communication resource pool from the network device,
        establish a communication connection that is based on the second communication path,
        determine a communication path for a vehicle-to-everything (V2X) service, wherein the communication path is selected from at least two communication paths, the at least two communication paths comprise the first communication path and a the second communication path, the first communication path is a communication path on which communication is performed using a PC5 interface, and the second communication path is a communication path on which communication is performed using a Uu interface that is configured for a message of the V2X service independently of other Uu traffic, and
        send a message of the V2X service using the communication path.

11. The apparatus according to claim 10, wherein to determine the communication path for the V2X service, the instructions further cause the processor to:
receive indication information from the network device, wherein the indication information is used to indicate the communication path for the V2X service, and the communication path indicated by the indication information is selected by the network device from the at least two communication paths; and
determine the communication path based on the indication information.

12. The apparatus according to claim 10, wherein before determining the communication path for the V2X service, the instructions further cause the processor to:
send first identification information to the network device, wherein the first identification information is used to request the network device to indicate a communication path for the V2X service.

13. The apparatus according to claim 10, wherein before determining the communication path for the V2X service, the instructions further cause the processor to:
send message type information of the V2X service to the network device; or
send radio environment measurement information of the first communication path, or radio environment measurement information of the second communication path to the network device.

14. The apparatus according to claim 10, wherein the communication path indicated by the indication information is the first communication path; and wherein the instructions further cause the processor to:
receive configuration information of an D2D direct communication resource pool from the network device, wherein the D2D direct communication resource pool is configured for the first communication path.

15. The apparatus according to claim 10, wherein to determine the communication path for the V2X service, the instructions further cause the processor to:
select the communication path from the at least two communication paths.

16. The apparatus according to claim 15, wherein to select the communication path from the at least two communication paths, the instructions further cause the processor to:
select the communication path from the at least two communication paths based on message type information of the V2X service; or
select the communication path from the at least two communication paths based on radio environment measurement information of the first communication path, or radio environment measurement information of the second communication path.

17. The apparatus according to claim 14, wherein the D2D direct communication resource pool comprises a dedicated resource pool.

18. A non-transitory computer-readable storage medium comprising instructions which, when executed by a computer, cause the computer to perform operations, the operations comprising:
sending, by a terminal device, second identification information to a network device, wherein the second identification information is used to request the network device to configure a device-to-device (D2D) direct communication resource pool for a first communication path;
receiving, by the terminal device, configuration information of the D2D direct communication resource pool from the network device;
establishing, by the terminal device, a communication connection that is based on a second communication path;
determining a communication path for a vehicle-to-everything (V2X) service, wherein the communication path is selected from at least two communication paths, the at least two communication paths comprise the first communication path and the second communication path, the first communication path is a communication path on which communication is performed using a PC5 interface, and the second communication path is a communication path on which communication is performed using a Uu interface that is configured for a message of the V2X service independently of other Uu traffic; and
sending a message of the V2X service by using the communication path.

19. The non-transitory computer-readable storage medium of claim 18, wherein determining the communication path for the V2X service comprises:
receiving, by the terminal device, indication information from the network device, wherein the indication information is used to indicate the communication path for the V2X service, and the communication path indicated by the indication information is selected by the network device from the at least two communication paths; and
determining, by the terminal device, the communication path based on the indication information.

20. The non-transitory computer-readable storage medium of claim 18, further comprising: before determining the communication path for the V2X service,
sending, by the terminal device, first identification information to the network device, wherein the first identification information is used to request the network device to indicate the communication path for the V2X service.

* * * * *